United States Patent [19]

Holtrop

[11] 4,440,365
[45] Apr. 3, 1984

[54] LAUNCH MECHANISM

[75] Inventor: John W. Holtrop, Ridgecrest, Calif.

[73] Assignee: The United States of America as represented by the Secretary of the Navy, Washington, D.C.

[21] Appl. No.: 326,872

[22] Filed: Dec. 3, 1981

[51] Int. Cl.³ .............................................. B64D 1/02
[52] U.S. Cl. ................................. 244/137 R; 89/1.5 C; 89/1.5 G
[58] Field of Search ................... 244/137 R, 63, 118.1; 89/1.5 R, 1.5 B, 1.5 C, 1.5 F, 1.5 G, 1.5 H, 1.5 R; 294/83 R, 83 A

[56] References Cited

U.S. PATENT DOCUMENTS

| | | | |
|---|---|---|---|
| 3,273,459 | 9/1966 | Lardin | 244/137 R |
| 3,799,478 | 3/1974 | Costes et al. | 244/137 R |
| 4,008,645 | 2/1977 | Herbert | 89/1.5 G |

OTHER PUBLICATIONS

Ser. No. 231,718, filed Feb. 5, 1981, John W. Holtrop, Constrained Store Ejector.

Primary Examiner—Galen L. Barefoot
Attorney, Agent, or Firm—Robert F. Beers; Frederick A. Wein

[57] ABSTRACT

The present invention relates to a launch mechanism for launching a store from a vehicle such as an aircraft. The store is stored in a controlled manner close to the body of the aircraft and, in preparation for launch, is displaced in an arcuate or circular trajectory away from the vehicle by a swing arm pivotally constrained to the vehicle. A release mechanism is provided at the distal end of the swing arm for controlled securement and release of the store.

3 Claims, 5 Drawing Figures

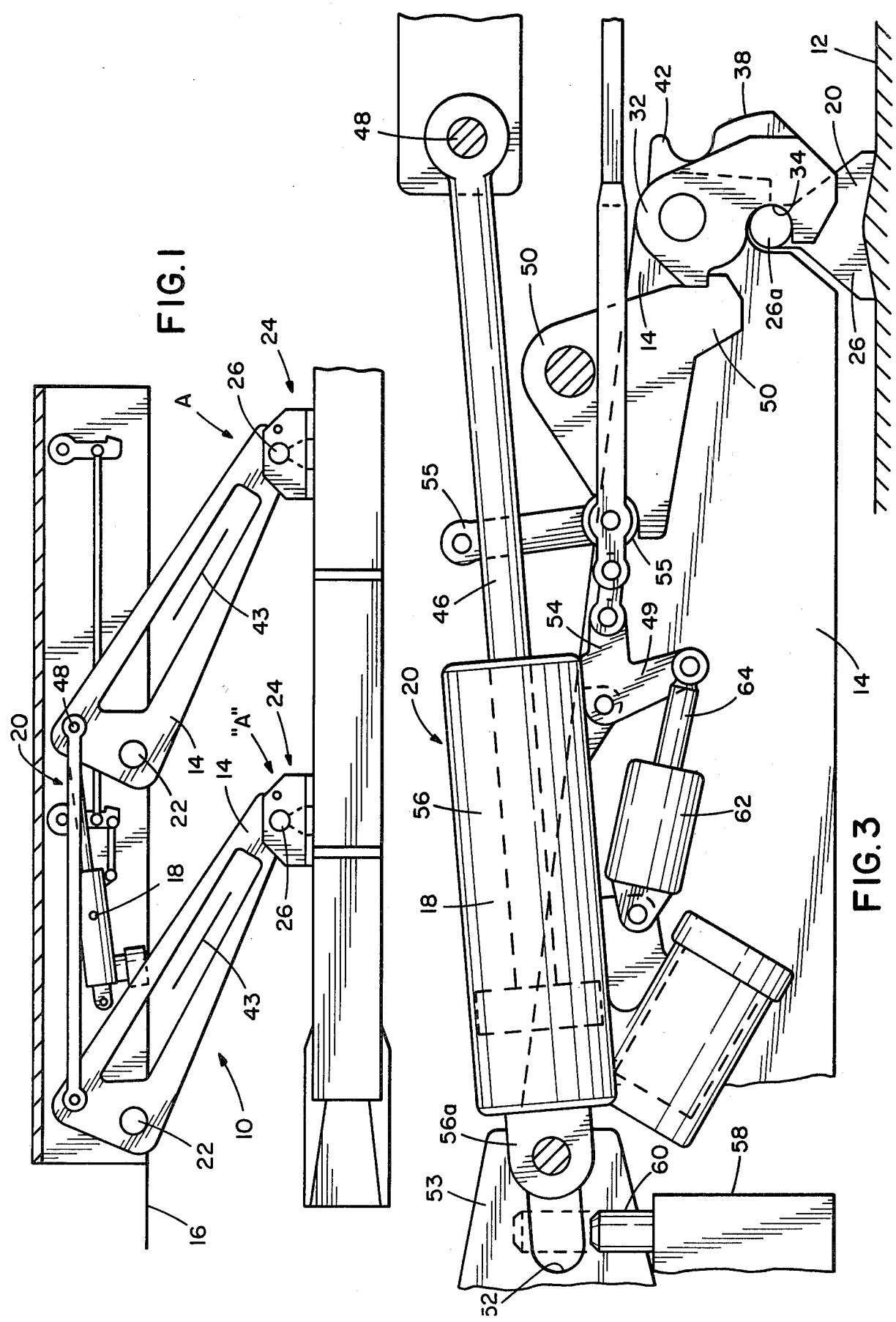

LAUNCH MECHANISM

BACKGROUND OF THE INVENTION

The present invention relates to launch mechanisms for launching a store from a moving vehicle, and more particularly, to mechanisms for the high speed launching of bombs, missiles, rockets, or the like from a military aircraft.

Launch mechanisms currently used often release the store within six inches of the body of the aircraft. In such mechanisms, the store is held in place by hooks connected to a lug secured to the store and launching is performed by release of the hooks so that the store is dropped.

As the speed and performance of aircraft are improved, the prior launch devices become inadequate. At very high speed, the store might actually contact the underside of the aircraft during launch thereby causing damage. It is important that separation of the store from the aircraft be clean and for such clean separation it is necessary that the store be displaced at increased distances from the aircraft and released in a manner during launch under adverse combat conditions, i.e. during high G manuevers and at high speeds. However, in order to not effect the high speed performance of the newer aircraft, it is necessary that the store be carried in a manner having reduced drag. This requires that the store be carried close to the aircraft in a highly controlled manner and displacable from the aircraft while in a turbulent environment with a high degree of control while maintaining the orientation of the store to a high precision for a clear ballistic path of the bomb or the missile.

Accordingly, as performance requirements of aircraft are increased, it becomes increasingly important to launch the store from an aircraft on a true trajectory in a manner assuring safe launch. The launching of a store from an aircraft engaged in combat manuevers at high speeds or during other situations of high wind turbulence requires increased reliability, high precision, and improved stiffness of the launch mechanism in order to adequately control the store. Increased control is important and it is also important that the store be positioned as distant as practicable from the body of the plane and maintained in such position at launch. One way of accomplishing the above requirements is disclosed in U.S. patent application entitled "Constrained Store Ejector", Ser. No. 231,718 filed Feb. 5, 1981, of a common assignee. As disclosed therein, independent pistons push a store away from the body of the plane or vehicle in a straight rectilinear manner. However, such a mechanism occupies valuable space within the body of the aircraft in order to house the piston and displacement assembly.

Additionally, it is desirable to provide a release mechanism for the store which is highly reliable. Prior art methods comprise simple hooks which are released upon command. Accordingly, it is desirable to provide a release mechanism for the improved launch mechanism providing a greater reliability and control of the store.

SUMMARY OF THE INVENTION

Briefly, the present invention relates to a launch mechanism for launching a store from a vehicle such as an aircraft. The store is stored in a controlled manner close to the body of the aircraft and, in preparation for launch, is displaced in an arcuate or circular trajectory away from the vehicle by a swing arm pivotally constrained to the vehicle. The store is secured to the swing arm by a hook securingly engaging a lug of the store with the hook being pivotable about a first pivot point. The hook is provided with cam follower surface for movement against by a cam disposed in fixed relationship to the store. Upon pivotal movement of the swing arm such that the store is transported from a storage position to a launch position in an arcuate trajectory, the cam will move along the cam follower surface and engage a tang connected to the hook for forcing the hook to disengage from store. The hook is provided with a cutaway area for providing clearance for movement of the hook with respect to the cam upon disengagement.

OBJECTS OF THE INVENTION

Accordingly, it is an object of the present invention to provide a vehicle launch mechanism wherein the store is moveable in an arcuate trajectory away from the vehicle for positioning in a launch position. Another object of the present invention is to provide a vehicle launch mechanism having increased reliability and improved lateral stiffness for supporting the store. A further object of the present invention is to provide a release mechanism for a store, said release mechanism being precisely controllable and reliable when extended from the aircraft or vehicle. Still another object of the present invention is to provide a displacement mechanism for positioning the store in a launch position wherein the actuator can be defeated by a safety means with the safety means in turn being defeatable by a secondary release means for permitting launch of the store. Further objects and advantages of the present invention will become apparent as the following description proceeds and the features of novelty characterizing the invention will be pointed out with particularity in the claims annexed to and forming a part of this specification.

BRIEF DESCRIPTION OF THE DRAWINGS

For a better understanding of the present invention reference may be had to the accompanying drawings wherein:

FIG. 1 shows an overall plan view of the launch mechanism of the present invention.

FIG. 3 shows a plan view of an embodiment of the arcuator displacement mechanism of the present invention.

DETAILED DESCRIPTION OF THE PREFERRED EMBODIMENT

Figure 2A:
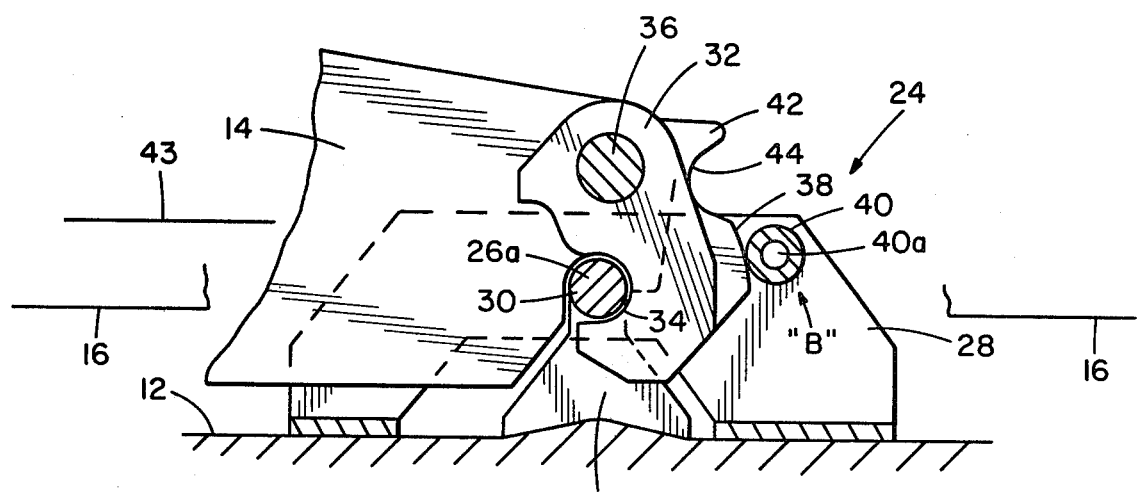
FIGS. 2A, B and C show a plan view, on an enlarged scale, of the release mechanism of the launch mechanism of FIG. 1.

Referring now to the drawings wherein like reference numerals have been applied to like parts, FIG. 1 shows a launch mechanism, generally designated 10, wherein a store 12 is secured by a plurality of swing arms 14 to the vehicle or aircraft 16. Upon actuation upon command by the firing of an actuator 18 for actuating a displacement mechanism, generally designated 20, the swing arms 14 pivot about pivot point 22 moving the store along an arcuate trajectory shown by the arrow "A" from a storage position proximate the aircraft to a launch position distal of the aircraft. A release mechanism, generally designated 24, is disposed at the distal end of swing arm 14 for rigidly securing the store 12 to the arm 14 prior to launch and releasing the store 12 at launch.

It has been found that displacement of the store 12 from the store position close to the aircraft to the launch position distant of the aircraft is better provided by a pivotal mechanism such as swing arm 14 pivoted about pivot point 22 such that the store 12 travels in an arcuate or circular path downward from the aircraft. Such a construction is simple, less expensive, and requires only one part and one bearing thereby providing greater reliability. Additionally, lateral stiffness is more easily achievable in order to exactly control the position of the store 12.

More particularly, referring to FIG. 1, there is shown an intermediate position the swing arms 14. For launch, the arms 14 are pivoted about pivot point 22 to the direction "A" such that the angle of the longitudinal axis of the swing arm 14 is changed from generally horizontal or zero angle with respect to the aircraft 16, through intermediate angular position, to a predetermined launch angle. The distal portion of arm 14 is secured to store 12 which travels an arcuate path during displacement from the storage position to the launch position. The movement of the respective swing arms 14 is motivated by the displacement mechanism 20 which will be discussed in greater detail hereinafter.

As the arm 14 is moved through successive angular positions, events transpire in a release mechanism 24 as shown in FIGS. 2A, B and C. The angles which will be discussed in the exemplary embodiment are zero degree position of the longitudinal orientation of swing arm 14, 30° as is shown in FIG. 2B, and 40° which is shown in FIG. 2C.

FIG. 2A shows the store in the storage position in proximate relationship to the vehicle 16. A lug 26 is unitary with store 12 and has a tubular portion 26a for securing store 12. A store sensor 28 is pivotally secured to arm 14 at a pivot point 30 which is axially coincident with the central axis of lug portion 26a. One side of the store sensor 28 is in abutting contact with the surface of store 12. Hook 32 is provided with a concave attachment portion 34 engaging lug 26a and securing store 12 to the arm 14. The hook 32 is pivotable about a pivot point 36 and is provided with a cam follower surface 38 at the opposite side from the attachment portion 34. A cam 40 unitary with store sensor 28 is in abutting engagement with cam follower surface 38. Cam follower surface 38 is provided with a tang 42 and a concave clearance area 44, both of which will be discussed in more detail hereinafter.

Referring again to FIG. 2A, in the store position the longitudinal axis 43 of arm 14 is generally horizontal at a zero degree orientation with the body of vehicle 16 and store 12. In the store position lug 26 is engaged with the attachment portion 34 of hook 32 and cam 40 engages the cam follower surface 38. Cam 40 can be a tubular protrusion extending normal to store sensor 28 in which case cam 40 is made of a suitable lubricant material, or as in the exemplary embodiment, is a rotatable pully, secured for rotation about a tubular bearing 40a. Upon actuation for displacing the store 12 from the store position to a launch position distant from the vehicle 16, the swing arms 14 are pivotally rotated about pivot point 22 motivated by actuator 18.

Figure 2B:
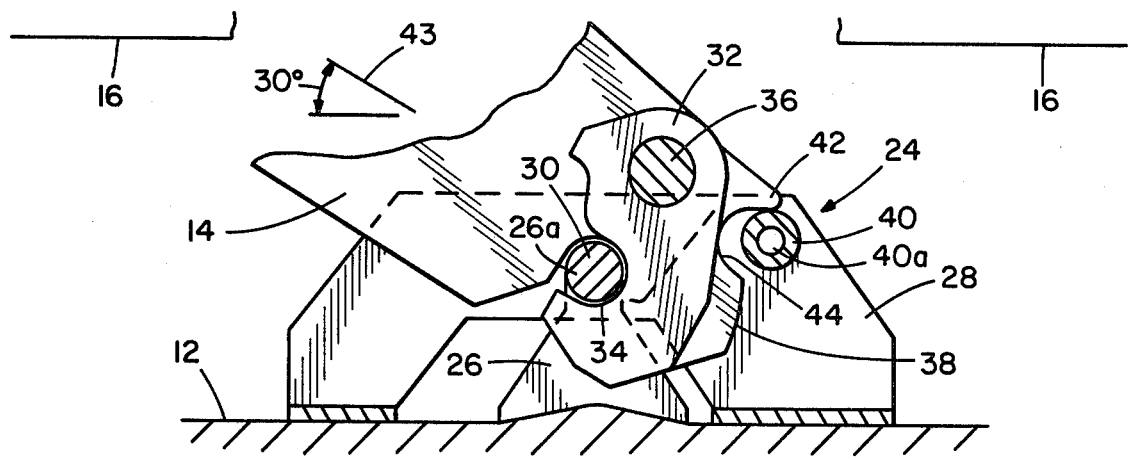
Figure 2C:
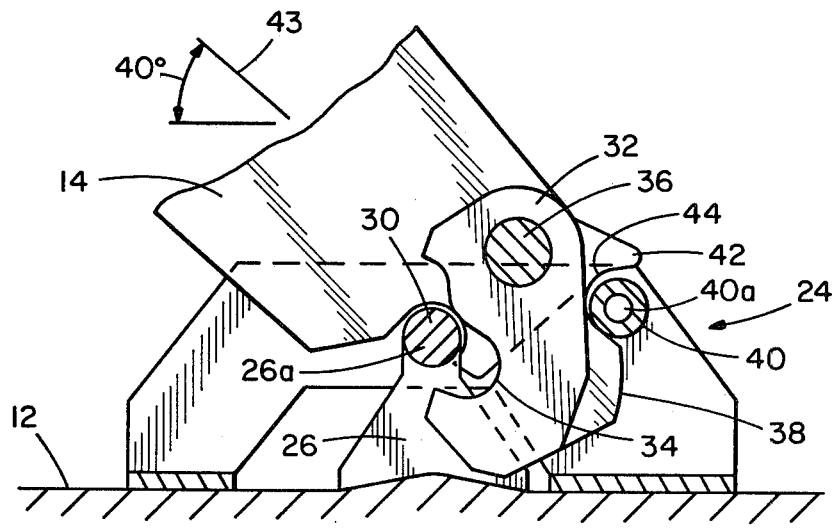

Referring now to FIG. 2B wherein is shown the status of release mechanism 24 at a swing arm 14 angle of approximately 30°. In this position, the hook 32 and the arm 14 have been rotated 30° with the lug 26a rotating within the attachment portion 34 and the cam 40 having traveled along the cam follower surface 38 in the direction "B" with cam 40 being in contact with tang 42. As shown in FIG. 2B, cam 40 is in abutting contact with tang 42 and any further movement in direction "B" will force tang 42 to also move in direction "B" for pivoting hook 32 about pivot point 36 for moving portion 34 out of engagement with securement portion 26a for releasing store 12. It should be noted that cam 40 can be structured to contact tang 42 at angles of orientation of swing arm 14 other than the 30° chosen in the exemplary embodiment. In this position, store sensor 28 has also pivoted about its pivot point axially coincident with pivot point 30 for maintaining store sensor 28 in contact with store 12.

Referring now to FIG. 2C, the swing arm 14 is shown at an angle of 40° which in the exemplary embodiment is the full release angle. This angle can be predetermined at any convenient angle even 90° in which case the maximum distance of displacement of the store 12 from vehicle 16 is achieved at the time of launch with a tradeoff being reduced stiffness and control. Upon the movement of arm 14 from 30° shown in FIG. 2B to 40° shown in FIG. 2C the cam 40 pushes against tang 42 which acts as a lever and thus rotates hook 32 about pivot point 36 disengaging attachment portion 34 from lug 26a. This causes hook 32 to move away from attachment of lug 26 and backwards towards cam 40. In this position the clearance for the movement of hook 32 towards cam 40 is provided by the concave clearance portion 44. In this position, the store has been released from the aircraft and will move away from the aircraft under the force of gravity for either dropping or ignition if the store happens to be a missile.

Referring now to FIG. 3 wherein the displacement mechanism 20 is shown in greater detail, secured to the vehicle preferably at the underside, often under a wing. The actuator 18 is fireable upon pilot command and typically is a gas cartridge. Upon firing, the actuator shaft 46 is propelled against pivot 48 to initiate movement of arm 14 (see FIG. 1). Because hook 32 has not yet been released from latch 50, actuator housing 56 and extension member 56a unitary with housing 56 is pushed backwards through a slot 52 provided in a support member 53. The backward movement of extension member 56a and actuator housing 56 pulls a release link 54 pivotally secured to the housing 56. The pulling motion of release link 54 causes pivot link 55 to unlatch swing arm 14 by moving latch 50 out of engagement with swing arm 14. Once latch 50 is released by pivot link 55, latch 50 pivots and releases hook 32 which allows the respective swing arm 14 to open as shown in an intermediate position in FIG. 1.

A safety means 58 is provided to insure that store 12 is not released accidently. The safety means 58 can be a gas cartridge, electrical solenoid, or the like. When safety means 58 is actuated, shaft 60 of safety means 58 is extended into slot 52 and blocks any movement actuator shaft 56a within slot 52 thereby preventing the release of store 12.

A secondary release means 62 is provided for overriding safety means 58 if required. Secondary release means 62 is mounted on actuator body 56 and, upon command, a shaft 64 of release means 62 is extended which in turn causes release link 54 to move backward in the same manner as described above upon backwards movement of actuator extension member 56a within the slot 52. However, in this case, the shaft 46 need not move backwards within slot 52 in order for pivot link 55 to release latch 50. Thus latch 50 is unlatched independently of actuation of actuator 18.

Thus there is disclosed a launch mechanism for securing a store in a store position and upon actuation, launching the store from a vehicle such as an aircraft or the like. The store is stored close to the body of the aircraft and in preparation for launch is displaced in an arcuate trajectory away from the vehicle by a swing arm pivotally constrained to the vehicle in a highly controlled and precisely manner. The store is secured to the swing arm by a release mechanism and is released upon the positional orientation of the swing arm at a predetermined angular position with respect to the aircraft. The release mechanism includes a cam movable along a cam follower surface of the securing hook. The cam moves along with the swing arm and upon the swing arm achieving a predetermined angular position, causes the hook to detach from the store by pushing a tang which acts as a lever and causes the hook to swing away thereby releasing the store.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed as new and desired to be secured by Letters Patent is:

1. A release mechanism for securing and releasing a store having a securing lug comprising:
   a swing arm having length, a proximate end portion, a distal end portion, and pivotingly movable at the proximate end with respect to the vehicle between a store storage position and a store launch position, and
   means for securing and releasing the store disposed at the distal end portion, said means for securing and releasing comprising:
   a hook for securingly engaging the securing lug, the hook being pivotable about a first pivot point disposed at the distal end portion and pivotably disengagable from the lug for release of the store,
   a cam disposed in predetermined relationship to the store, the cam and the store being pivotably movable about a second pivot point with respect to the swing arm,
   the hook being provided with a cam follower surface movingly engagable with the cam upon pivoting of the arm at the proximate end portion with respect to the vehicle, the cam being pivotable with respect to the swing arm about the second pivot point, and
   a tang disposed along a portion of the cam follower surface and engagable with the cam upon pivoting of the swing arm into a predetermined position intermediate the storage position and the launch position, the hook being pivotable about the first pivot point upon engagement of the tang with the cam upon further travel of the cam past a predetermined position for moving the hook out of engagement with the securing lug upon further pivoting of the swing arm past the predetermined position.

2. A release mechanism of claim 1 wherein the hook is provided with a clearance means in the cam follower surface proximate the tang for providing movement clearance between the hook and the cam.

3. The release mechanism of claim 2 wherein the cam is movable into the clearance means in the cam follower surface when the hook is disengaged from the lug.

* * * * *